United States Patent [19]

Yamashita et al.

[11] 4,106,464

[45] Aug. 15, 1978

[54] PROGRAMMED CONTROL SYSTEM FOR A LEAN-BURNING INTERNAL COMBUSTION ENGINE

[75] Inventors: Ryuichi Yamashita; Hiromitsu Matsumoto, both of Hamamatsu; Masato Eda, Iwata, all of Japan

[73] Assignee: Yamaha Hatsudoki Kabushiki Kaisha, Iwata, Japan

[21] Appl. No.: 717,365

[22] Filed: Aug. 24, 1976

[51] Int. Cl.² .................... F02N 17/00; F02M 23/04; F02M 37/00

[52] U.S. Cl. .......................... 123/179 A; 123/124 A; 123/119 A; 261/34 A; 261/DIG. 67

[58] Field of Search .......... 123/119 A, 119 D, 124 A, 123/179 R, 179 A, 179 G, 180 R; 261/34 A, 34 B, DIG. 67, DIG. 74, 23 A, 39 D

[56] References Cited

U.S. PATENT DOCUMENTS

| | | | |
|---|---|---|---|
| 1,883,809 | 10/1932 | Mennesson | 123/180 R |
| 2,123,522 | 7/1938 | Bryan | 123/179 A |
| 2,355,346 | 8/1944 | Weber | 261/34 B |
| 2,389,922 | 11/1945 | Mennesson | 261/34 A |
| 3,789,812 | 2/1974 | Berry et al. | 123/117 A |
| 3,800,758 | 4/1974 | Sutherland | 123/119 A |
| 3,800,764 | 4/1974 | Goto et al. | 123/119 A |
| 3,818,880 | 6/1974 | Dawson et al. | 123/119 A |
| 3,866,588 | 2/1975 | Nakada et al. | 123/124 A |
| 3,877,448 | 4/1975 | Schmid | 123/179 A |
| 3,934,571 | 1/1976 | Mennesson | 123/179 G |

*Primary Examiner*—Charles J. Myhre
*Assistant Examiner*—David D. Reynolds
*Attorney, Agent, or Firm*—Donald D. Mon

[57] ABSTRACT

A system and method for controlling a lean-burning internal combustion engine. The system and method enable a starter carburetor to operate at cold but not at hot temperature, to provide gulp air and counterbalance means for the starter carburetor, together with means to inhibit them at startup and for a brief time thereafter, and to inhibit exhaust gas recirculation when it would be deleterious to smooth operation. The system also provides for continuous accelerator pump operation during acceleration except at high temperatures. The objective is to secure smooth operation at startup, cold, warm or hot, and during transient conditions during engine warmup.

22 Claims, 9 Drawing Figures

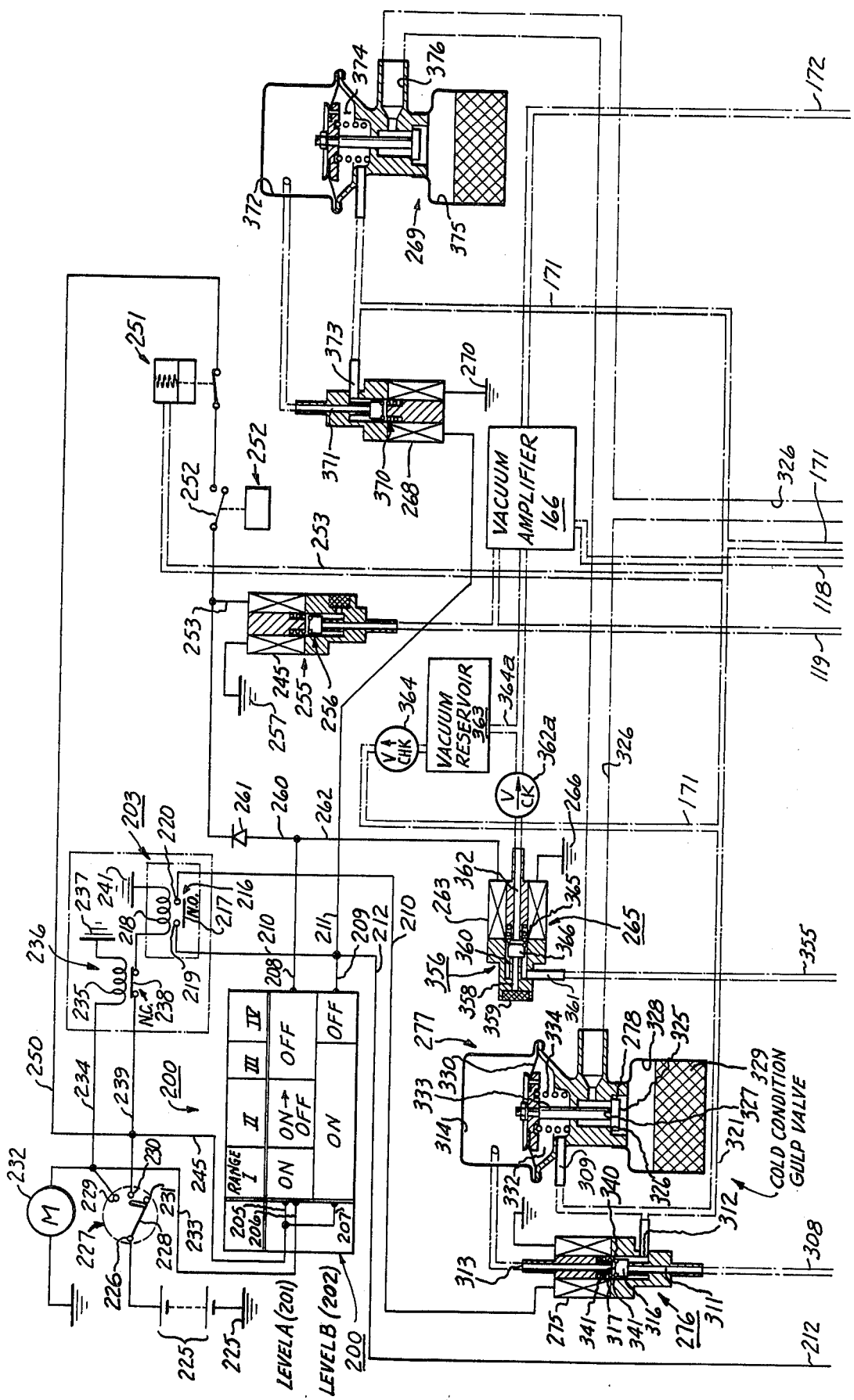

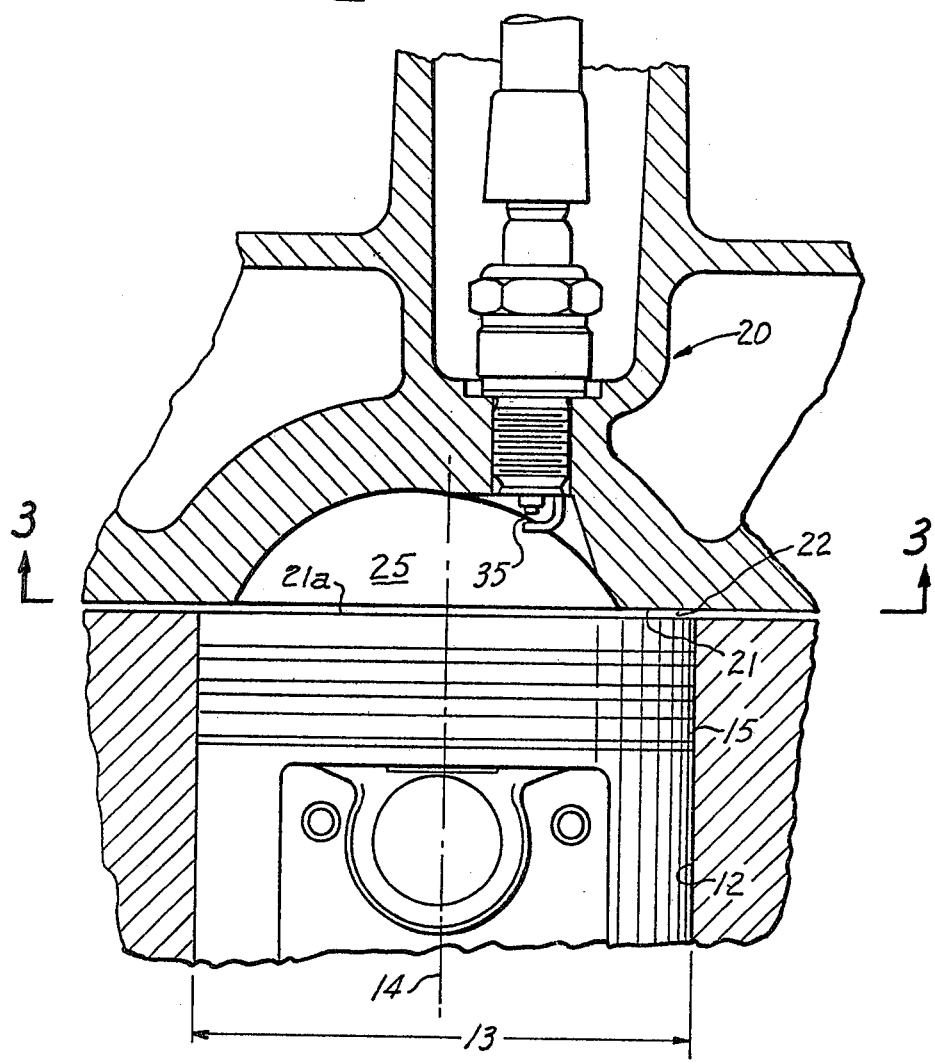

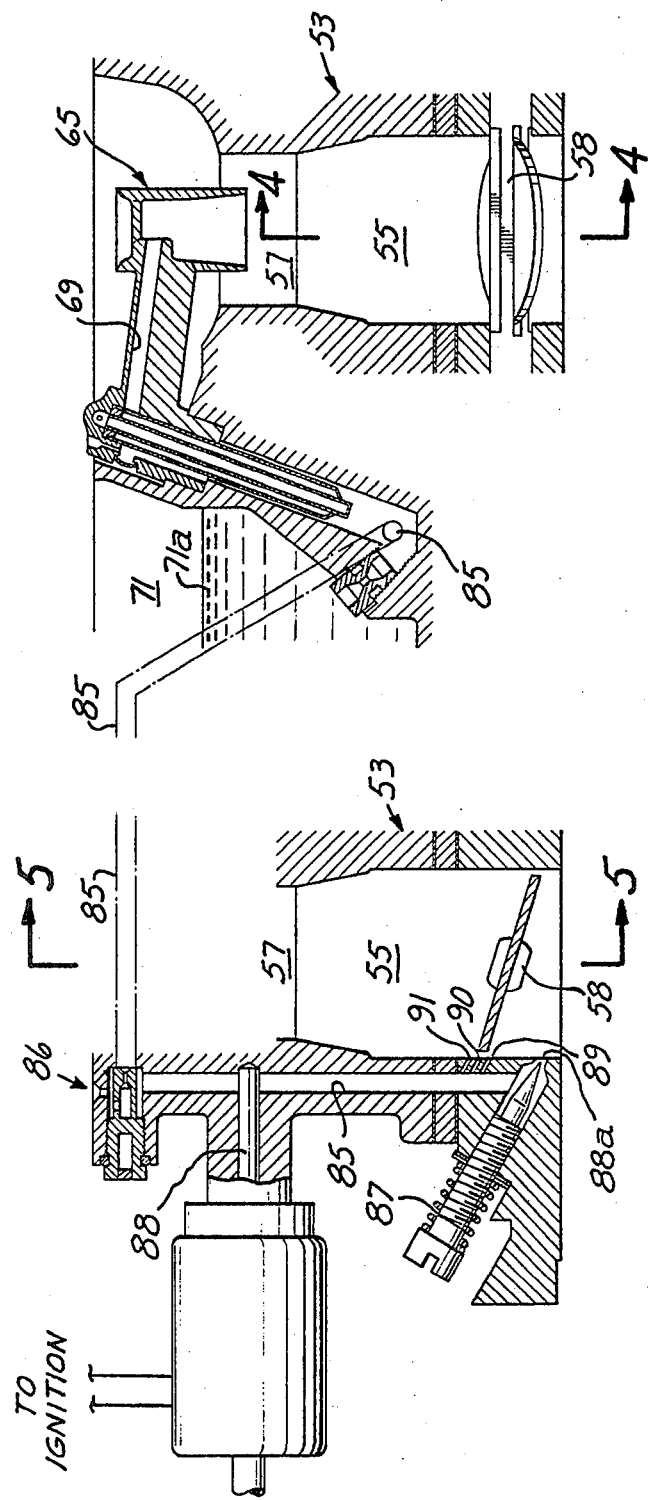

PROGRAMMED CONTROL SYSTEM FOR A LEAN-BURNING INTERNAL COMBUSTION ENGINE

This invention relates to a lean-charge burning four cycle internal combustion engine, and to a method for operating the same, all with acceptably low fuel consumption per kilometer travelled and with emission of pullutants at an acceptably low level.

It has long been appreciated that an engine which consumes a charge of air and fuel with an air/fuel ratio that is greater than the stoichiometric value (lean charge) should emit less pollutants than an engine which consumes a charge having an air/fuel ratio which is less than stoichiometric (rich charge). The stoichiometric ratio for air and gasoline is approximately 14.9. The theory is that a lean mixture (charge) provides sufficient oxygen to oxidize all of the hydrocarbons (HC) from the fuel, and all of the carbon monoxide (CO) in the exhaust gas, to water and to carbon dioxide. Water and carbon dioxide are not objectionable emissions. However, the use of a lean charge is complicated by a tendency to produce oxides of nitrogen (NOx) at unacceptable levels when the combustion chamber temperature is high, and the air/fuel ratio is close to stoichiometric.

Attempts to reduce the NOx emissions, especially by using considerably leaner mixtures, i.e., air/fuel ratios greater than about 18, have for various reasons resulted in a reduction of engine operating economy, and the mileage has been unfortunately low.

One serious problem area in the operation of lean combustion engines is in their starting up, especially at low temperatures. Also, there are conditions of instability in the fuel and air supply to the engine at various transient conditions which can cause excessive pollutant emission and roughness of operation, leading to poor economy and poor drivability. It is an object of this invention to make a lean combustion engine more practical and acceptable by providing means to stabilize its operation at various transient conditions, including cold start.

It is an advantage to provide a starter carburetor to assist with the starting and very cold operation of a lean-burning engine. Such a carburetor discharges a relatively rich air/fuel mixture, perhaps about 10:1, to the induction means to supplement the mixture provided by the principal (lean) carburetor. It is especially helpful when starting a cold engine, but is less helpful, and even undesirable, when the engine is hot. Accordingly, thermally responsive means is provided which also includes limitation means effective under certain circumstances, that limit the operation of the starter carburetor to relatively low engine temperatures and, in a middle-temperature range, to a limited period of time.

Furthermore, it is known that at the time of acceleration, the film of liquid fuel which often forms on the wall of the intake pipes vaporizes quickly when the pressure reduces abruptly. This presents an undesirable burst of overly-rich mixture that creates excessive emission of unburned hydrocarbons (HC) and carbon monoxide (CO). It has been proposed to supply additional air to the mixture at the time of deceleration to compensate for this sudden, but brief, burst of additional fuel, and such a valve is provided in this invention. This valve is sometimes called a "gulp valve", and is responsive to reduced pressure in the induction means. However, during the time of cranking, and immediately after the engine catches and the ignition switch is turned from the cranking to the run or operating position, the lower pressure in the induction means could be mistaken by a sensing means as an indication of deceleration conditions. Then it could be possible for air to be introduced through the gulp valve, which would cause a leaning of the mixture that would be undesirable at that time.

Accordingly, means is provided to disable the gulp valve during cranking, and preferably also for a few seconds thereafter, and to enable the gulp valve to respond to demand for additional air thereafter.

It is another object of this invention to provide "gulp" air at deceleration conditions in amounts respective to the demand of the engine and appropriate to the temperature of the engine. Speaking generally, more gulp air is required at lower temperatures than at high temperatures.

Also, a starter carburetor supplies air/fuel mixture from a fuel bowl. The rate of supply of air/fuel mixture is determined in part by the air pressure in the fuel bowl above the liquid fuel. It has been proposed to modify the pattern of supply from a starter carburetor by connecting the upper region of the fuel bowl to the induction means. The effect of such an interconnection is to increase the supply of the mixture, and this is a very suitable arrangement. However, during cranking of the engine, and for a brief period of time immediately thereafter, say 5 seconds, after the engine has caught and the starter motor is deenergized, the use of the balance line can result in excessive response to the pressure in the induction means, and means is provided for closing the balance line for this brief period of time.

As an additional optional feature of this invention, an accelerator pump supplementary to the usual mechanical accelerator pump is provided which operates continuously during acceleration, instead of only for the brief period of time a mechanical accelerator pump is mechanically actuated. This invention provides such a pump, and a simple circuit for controlling it.

The above features are especially advantageous when used in various combinations with one another. However, they are also useful separately.

This invention also comprehends the method of operating an engine equipped as above, with a lean charge under most engine operating conditions.

The above and other features of this invention will be fully understood from the following detailed description and the accompanying drawings, in which:

FIGS. 1a and 1b are adjoining circuit drawings, partly in schematic, and partly in cutaway cross-section, showing the presently-preferred embodiment of the invention;

FIG. 2 is a side view, partly in cutaway cross-section, of a portion of FIG. 1;

Figure 6:
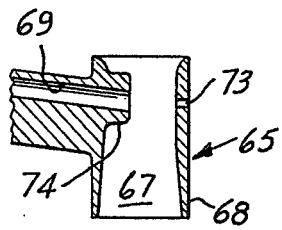
Figure 7:
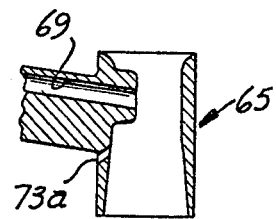

FIGS. 4 and 5 are axial cross-sections of a portion of FIG. 1, taken at 90° to each other as shown by section lines 4—4 and 5—5;

FIGS. 6 and 7 are cross-sections of principal nozzle constructions; and

Figure 8:
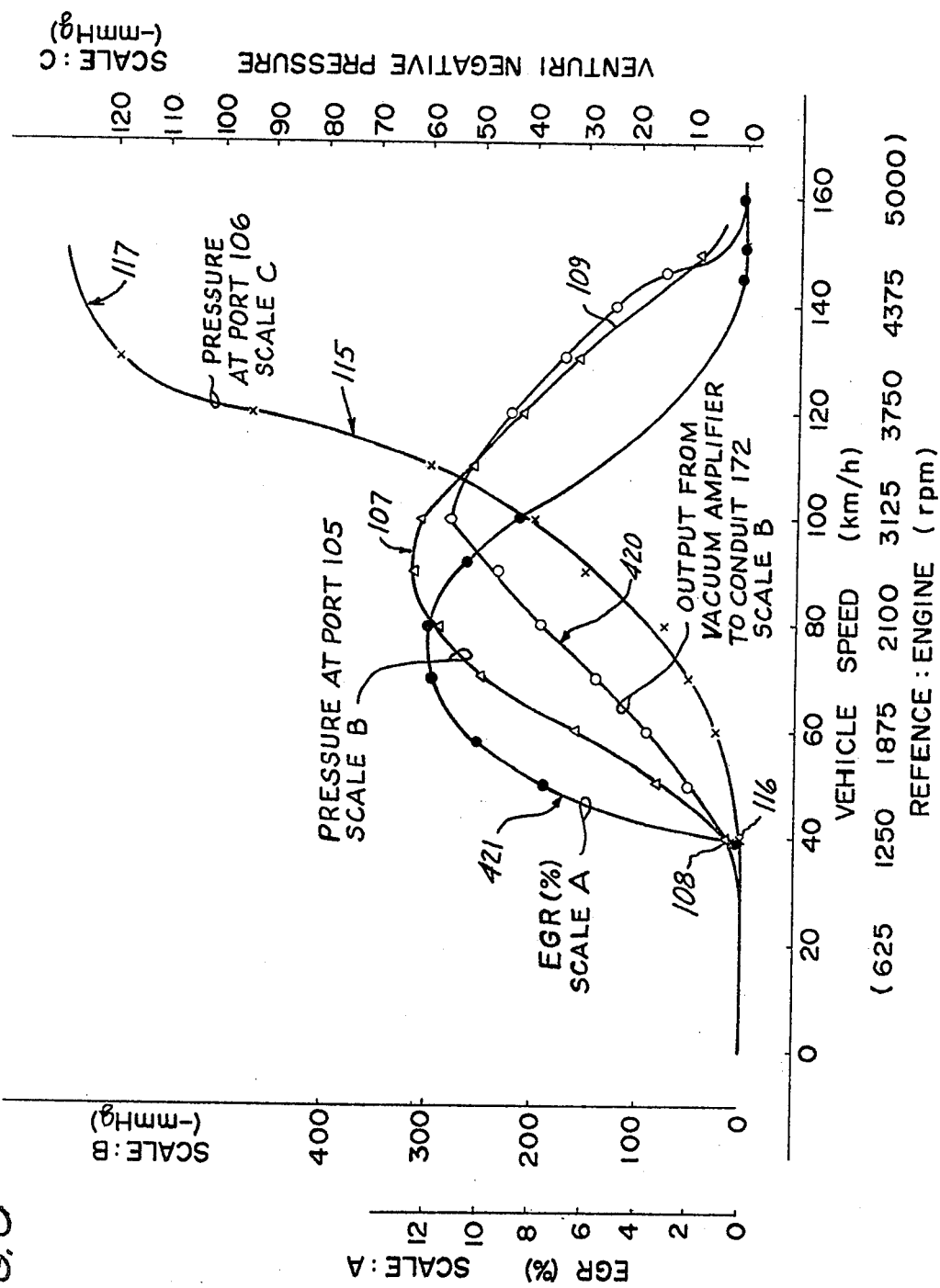

FIG. 8 is a graph showing certain features of a vacuum amplifier.

Figure 1B:
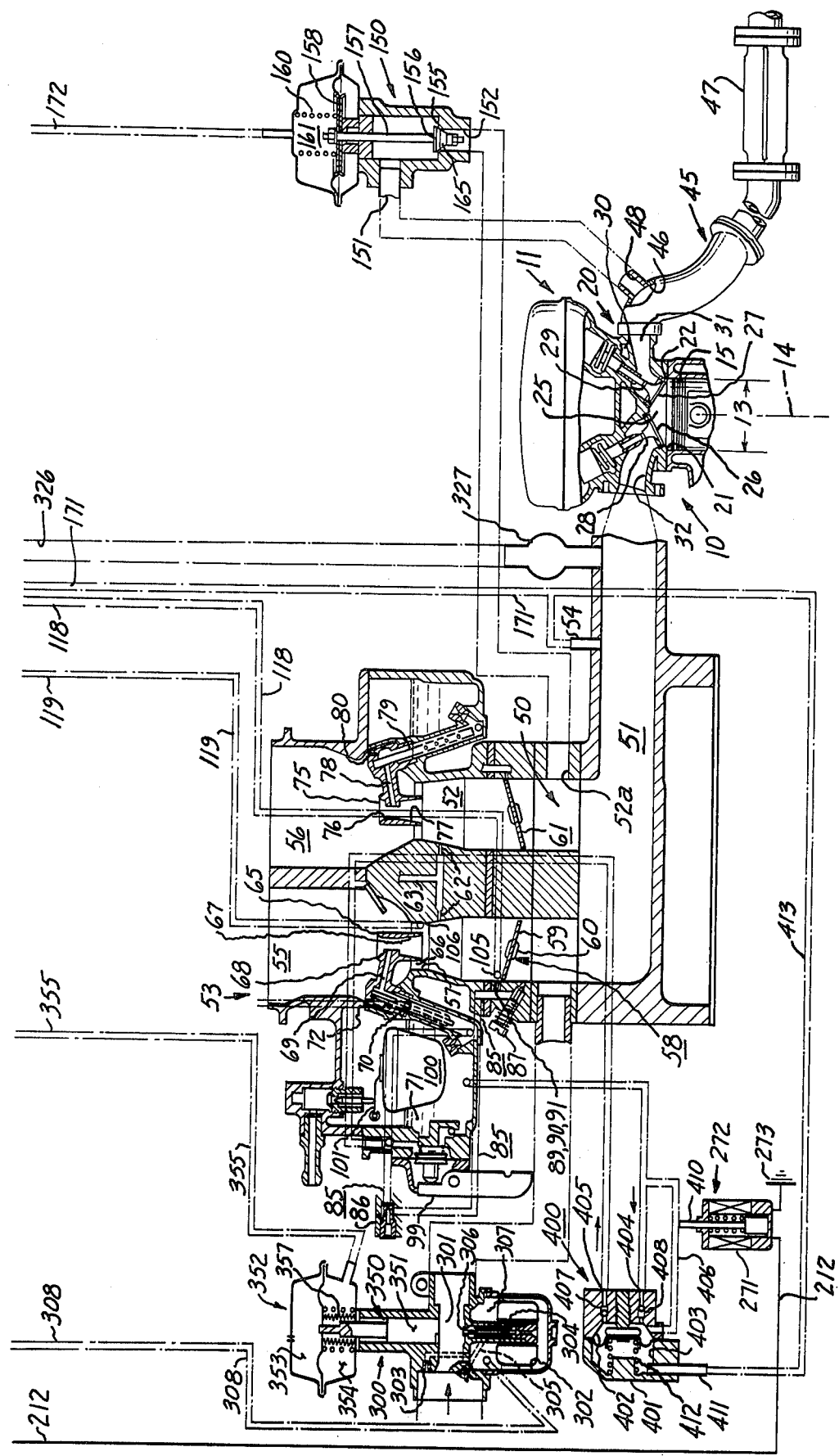

In FIGS. 1b and 2 there is shown an engine 10 with a plurality of cylinders 11. Cylinder 12 is typical of all of them, and only it will be described in detail. It is circular and has a diameter 13 and a central axis 14. A piston 15 is slidably reciprocably fitted in the cylinder. It makes a sliding fluid-sealing fit with the cylinder wall and reciprocates to accomplish the characteristic operation of a four-cylinder engine. A crank arrangement, not shown, is provided to convert the axial movement of the pistons into rotary motion of a crankshaft.

A cylinder head 20 is attached to, and overlays, the cylinders. It closes the upper end of each cylinder. A substantailly planar area 21 (FIGS. 2 and 3) faces and overhangs each piston for a purpose and to an extent which will be described in more detail below. At this point, it is sufficient to observe that a "squish region" 22 is formed between the piston and the planar area.

Figure 3:
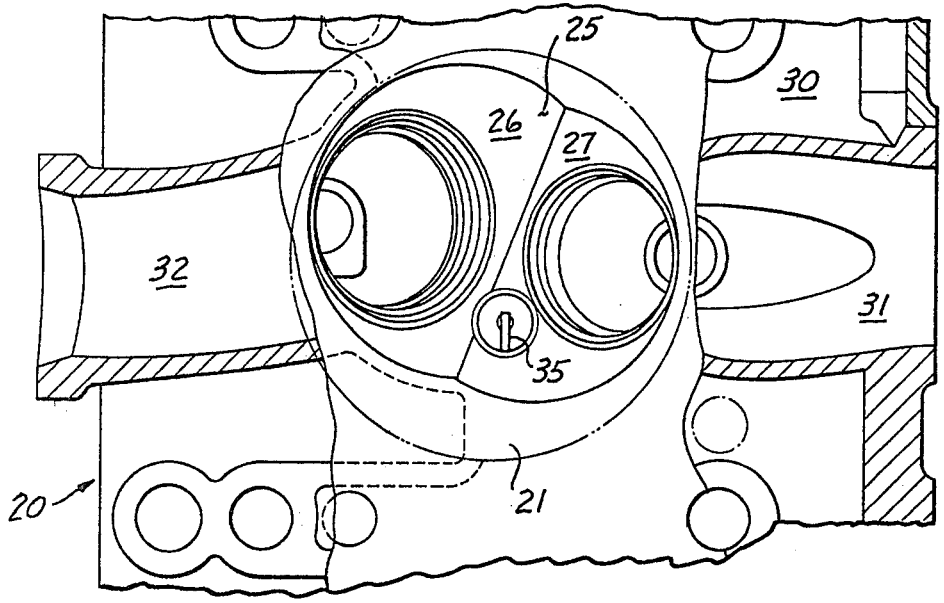
FIG. 3 is a cross-section taken at line 3—3 of FIG. 2.

A recess 25 is formed in the cylinder head inside the planar area. Preferably it includes two dome-like portions 26, 27 (FIG. 3). Intake valve means 28 (FIG. 1b) is provided in portion 26, and exhaust valve means 29 is provided in portion 27.

Coolant passages 30 are formed, around the cylinder, and around exhaust passage 31. However, the coolant means preferably does not cool intake passage 32. It is preferable for the intake passage to remain warm, in order to encourage the vaporization of the fuel in the charge, and to discourage the deposition of a film of fuel on the wall of the intake passage.

The intake and exhaust valves are opened and closed by a conventional cam system (not shown) which times their operation relative to the operating cycle.

Ignition means such as a spark plug 35, is disposed in each combustion chamber where it discharges a spark at an appropriate time relative to the stroke of the piston. The ignition means includes a conventional centrifugal distributor with a completely conventional set of points, a breaker and a coil (not shown).

Exhaust means 45 connects to the exhaust port of each cylinder, and forms a manifolded exhaust passage 46 that discharges exhaust gases to a catalytic converter (reactor) 47. The catalytic converter is conventional, and provides an enviroment where unburned hydrocarbons and carbon monoxide are converted to water and carbon dioxide in accordance with known processes. A recirculation port 48 is tapped into the exhaust passage to provide an outlet for gases that are to be recirculated (EGR) to repress the formation of oxides of nitrogen.

Induction means 50 includes an induction passage 51 that connects to the intake port, and to the throat 52 of a carburetor 53. A suction port 54 and a recirculation port 52a are formed through the wall of the induction means for purposes yet to be described. The induction means can if desired be a manifold supplying a plurality of cylinders from a single carburetor.

Carburetor 53 is a conventional two barrel type, having a primary barrel 55 and a secondary barrel 56. This invention is not limited to the usage of a multiple barrel type carburetor, or to a carburetor with only two barrels. A single barrel type is also useful, and so are carburetors with more then two barrels. Because this carburetor is conventional except for certain specific parts, it will be described only very generally, again except for these specific parts.

Briefly stated, the primary barrel includes a throat 57 which is restricted in cross-section so as to generate a reduced pressure as a consequence of the flow of air through it. A pivotally mounted throttle valve 58 is located in the throat of the primary barrel, at the upstream end of the induction means. The throttle valve is shown in its most closed position in FIG. 1b. It prevents substantial flow of air past it when in this position. The throttle valve comprises a plate 59 mounted to a shaft 60. The shaft can be turned so the plate opens the throat to flow. The amount of opening and the engine demand determine the rate of flow.

A secondary throttle valve 61 is pivotally mounted in the secondary barrel. Its construction and function are like those of the primary throttle valve. It controls the flow of air through the secondary barrel.

The primary throttle position is set by an acelerator linkage (not shown). This linkage is controlled by the operator to determine the engine speed at the existing load. The secondary throttle is customarily controlled by a vacuum actuator (not shown) which opens the secondary throttle after the primary throttle is fully opened, and there is a demand for additional air/fuel emulsion. Suction for this purpose is obtained from the barrels through orifices 62 and passage 63 (FIG. 1b).

A primary main nozzle 65 is placed in the throat of the primary barrel. There is a clearance 66 between the nozzle and the wall of the throat, and an aspiration passage 67 inside the tube 68 that forms part of nozzle 65. A primary fuel passage 69 discharges fuel/air emulsion into aspiration passage 67. The emulsion is obtained from an emulsion tube 70 that draws fuel 71a from a float-controlled fuel bowl 71, and air from a bleed passage 72 that faces upstream in the primary barrel.

Similarly, a secondary main nozzle 75 is placed in the throat of the secondary barrel. It includes a tube 76, an aspiration passage 77, and a secondary fuel passage 78. Emulsion tube 79 provides an air/fuel emulsion to the secondary fuel passage, comprised of fuel from the fuel bowl, and air from a bleed passage 80 that faces upstream in the secondary barrel.

Emulsion is discharged into passage 67, where it enters and mixes with air that flows through this passage. Better engine operation will result if this emulsion is promptly atomized. Atomization is assisted in this device by an air stream discharged laterally into the passage through an air port 73 that passes through tube 74, and draws air from the space between tube 74 and the wall of the carburetor throat. Preferably the stream of air from air port 73 discharges directly onto the stream of emulsion where it exits from passage 69. Preferably, passage 69 opens will into the aspiration passage, for example at the end of an internal boss 74. FIG. 7 shows than an air port 73a can be located elsewhere in the tube.

A slow flow passage 85 (FIGS. 1b and 5) departs from the fuel bowl, and includes a slow air jet 86 that introduces air into the emulsion drawn into passage 85. This emulsion enters the induction means past a slow adjusting screw 87 (idle screw) in accordance with conventional construction, below the throttle valve. This supplies emulsion to operate the engine even when the throttle valve is at its most-closed position.

In addition, the slow flow passage feeds emulsion to a plurality of slow flow ports 89, 90, and 91. Ports 90 and 91 are located upstream from the most-closed position of the primary throttle valve. Certain parts have been rotated 90° between FIGS. 1, 4 and 5 for clarity of illustration. Port 89 is located just downstream from the edge of the throttle valve's most-closed position (see FIG. 4). Port 89 therefore by-passes the throttle valve and is effective during idling and slow operation to introduce more emulsion to the induction means. Because of its location, it serves to provide a fast moving stream to aid in atomizing emulsion emitted from the idle jet below and in line with it. Also, because this port is exposed to a strong suction pressure, it causes more air to enter the slow flow system, which is an advantage in stabilizing flow in the slow flow system. Ports 90 and 91 become effective to supply emulsion when the throttle is opened. The bypass of emulsion through port 89, and the gradual stepwise increase of total supply of emulsion by the added increments from ports 90 and 91 smooths the operation of the engine at slow speed, and while accelerating at slow speed. An anti-dieseling valve 88 is shown in FIG. 4. It cuts off the fuel supply to the slow system when the ignition is shut off.

The remainder of the illustrated carburetor construction will readily be recognized by persons skilled in the art, such as the mechanical accelerator pump 99, fuel bowl float 100, and float-controlled valve 101.

A first signal port 105 and a second signal port 106 are formed in the carburetor body. First signal port 105 opens just upstream from the primary throttle valve's most-closed position. First signal port 105 senses the pressure adjacent to the throttle during engine operations. Second signal port 106 opens into the throat of the primary barrel just downstream from the primary nozzle. It senses the pressure in the primary throat.

The signals which the ports 105 and 106 provide are importantly different. FIG. 8 is a composite graph showing pressure at various vehicle speeds at level driving conditions. Curve 107 is a graph which shows the vacuum at port 105, as a function of vehicle speed, and indirectly of throttle opening. The throttle position is, of course, a function of many variables, but these curves are simplified by the assumption of normal engine loads without climbing, acceleration or deceleration. They serve, however, to illustrate the criteria of this invention. Two important points are shown on this curve: point 108, which is respective to a relatively low speed, and point 109, which is respective to a relatively high speed.

Curve 115 is a similar graph with the same abscissa and ordinate, respective to vacuum and speed, for port 106. Points 116 and 117 are respective to the same speeds at points 108 and 109, respectively. The importance of their differences will be discussed later.

Signal conduits 118 and 119 are connected to signal ports 105 and 106, respectively. Signal conduit 118 can be used as a signal for advancing the ignition, if desired. The ignition circuit, including a distributor, is not shown because it is not essential to an understanding of the invention. Suffice it to say that this engine is provided with all devices necessary for its operation, such as distributor, fuel pump, and the like.

The graph also includes a showing of a typical vacuum amplifier output, for example, curve 420 shows a useful signal for conduit 172. The EGR percentage is shown by curve 421. Note the cut off at the low end.

NOx emissions is lean combustion engines can be troublesome, because a hot engine (lean engines tend to run hot) generates more NOx than the same engine when cold. To oppose this production of excessive NOx, some exhaust gas is recirculated (EGR) from the exhaust means to the induction means. It is desirable to adjust the proportion of exhaust gases in the induction means, and for this purpose, an exhaust gas recirculation valve 150 (FIG. 1b) is provided.

Exhaust gas recirculation valve 150 has an inlet port 151 that is connected to recirculation port 48, and an outlet port 152 that is connected to port 52a in the induction means. The valve has a valve seat 155, and a valve plug 156. The plug is mounted to a rod 157 secured to a diaphragm 158. Ports 151 and 152 communicate with each other when the rod moves upwardly in FIG. 1b. The diaphragm and rod are biased downwardly by bias spring 160 so that the valve is normally closed. When a sufficient suction is exerted in chamber 161 above the diaphragm, the bias is overcome, the valve opens, and exhaust gas can flow from the inlet port to the outlet port.

Metering member 165 on the post is tapered. This enables the valve to establish a rate of flow through the valve which is a function of the suction pressure.

Because the best rate of recirculation of exhaust gas is not necessarily directly proportional to the suction pressure at either port 105 or 106, a vacuum amplifier 166 is provided to program the recirculation to desired amounts at respective engine conditions.

A vacuum amplifier can be adjusted to modify one of the signals from ports 105 and 106 by the other, or to select parts of different signals to respond to at different conditions. It can thus be programmed to produce a pressure output to chamber 161 appropriate to set valve 150 to pass the correct proportion of exhaust gas at the existing conditions (or to close the valve entirely).

The vacuum amplifier produces its suction output by modifying the flow toward a reservoir tank 363. This tank is connected to port 54 by a conduit 171 that includes a unidirectional check valve 364. Thus the induction means serves to maintain the reservoir at a low pressure. This is the source of suction for the vacuum amplifier's output. Its output is provided to chamber 161 through conduit 172.

An understanding of the operation of a primary relay 200 is fundamental to an appreciation of this invention. Therefore its functions will be described before making a detailed description of the elements which are under its control. When used on a liquid-cooled engine, relay 200 is exposed to coolant temperature, which is in turn a function of engine temperature. When used on an air cooled engine, the relay is exposed to some part of the engine whose temperature is reflective of the engine's temperature. The temperatures given herein as examples are those which are useful in starting and operating a four-cycle internal combustion engine for a typical Japanese automobile. However, the temperatures selected might be different from engine model to engine model, and different in other countries such as in the U.S.A., where engines are usually run at hotter temperatures. The criteria to establish "ranges" herein are as follows:

Range I

Temperatures so cold that supplementary fuel from a starter carburetor is desirable, exhaust gas recirculation is undesirable, and a continuous supply of supplementary fuel during acceleration is desirable. In a repesentative engine, below about 15° C.

Range II

A range which is usually transitional from lower temperatures to normal operating temperatures, during which the engine will be warmed to a "running condition" whereat the starter carburetor is no longer necessary, and exhaust gas recirculation is useful. In a representative engine, between about 15° and about 45° C.

Range III

A range wherein the running condition of Range II prevails, and in which a gulp valve should provide air at a relatively high rate suitable for colder engine temperature operation. In a representative engine, between about 45° and about 70° C.

Range IV

A range wherein the running condition of Range II prevails, but in which gulp air is to be supplied at a relatively lower rate that is suitable for hotter engine temperature operation. In a representative engine, above about 70° C.

Primary relay 200 has two circuits 201 (level A) and 202 (level B). Circuit 201 is temperature-responsive in all ranges, and time-responsive in Range II. Circuit 202 is temperature-responsive in all ranges, but is not time-responsive in any range. Some portions of the apparatus which are under control of primary relay 200 are also under control of a delay timer 203, but the response and control of timer 203 will be described separately.

The logic of relay 200 is set forth in conventional notation in FIG. 1a. Entry leads 205, 206, and 207 are shown connected to respective control levels of the relay. The term "on" means that when the relay sensor is at the respective temperature, its switch is closed, and it conducts electricity. The term "off" means that the switch is open, and it does not conduct electricity. The relay therefore comprises a pair of thermally-sensitive off-on switches. Each of the switches has a pair of terminals. The switch respective to the upper level (level A) has one of its terminals connected to leads 205 and 206, and its other terminal connected to lead 208. The switch respective to the lower level (level B) has one of its terminals connected to lead 207, and its other terminal connected to lead 209.

The switch respective to the upper level is modified so as also to be responsive to elapsed time in addition to temperature, when (and only when) its temperature is in temperature Range II.

The scheme of operation is as follows:

(a) In Range I, the switches in both levels are closed, and the timer feature of Level A is inoperative.

(b) In Range II, the indicated conditions will occur if the engine is started while in this temperature range. If, instead, the engine is started while its temperature is in Range I, then the switching conditions of Range II occur as soon as the temperature reaches whatever temperature is the lower limit of Range II (15° C in the example). More specifically, if the engine is started at a temperature in Range I, and the temperature rises and reaches the lower temperature of Range II, the switch in Level A remains closed and the timer starts to operate. After a period of time within which an engine would normally be expected to warm to the upper temperature of Range II, the switch in Level A is opened by the timer, whether or not such a higher temperature has been reached. This would be a rare occurrence. If the temperature of the engine at the time of starting is within Range II, the switch for Level A is initially closed, and after the said time has elapsed it is opened, again whether or not the upper temperature of Range II has been reached. It will remain open. In any event, should the upper temperature of Range II have been attained before the said period of time has elapsed, the switch for Level A will open as soon as that temperature is reached, without delay by the timer. The timer is only effective in Range II.

The switch of Level B is always closed in Range II.

(c) In Range III, the switch of Level A will be open, and the switch of Level B will be closed. If the engine temperature is in Range III at the time of starting, the timer is ineffective.

(d) In Range IV, the switch of Level A is open, and the switch of Level B is also open. If the engine had heated from the temperature of Range III to that of Range IV, the switch of Level B would have changed from closed to open when the temperature entered Range IV. If the temperature was within Range IV at the time of starting, there would have been no timer action in the primary relay, and the conditions of Range IV would have existed from the beginning.

Bearing in mind the function of primary relay 200, its connections to elements under its control will now be described.

Lead 209 has three branches 210, 211, and 212. Leads 211 and 212 proceed directly to their respective actuators, and thee actuators are therefore under only temperature control of the switch in level B.

Lead 210 connects to delay timer 203, and the actuators connected to lead 210 are therefore subject to control of both the thermal feature of Level B and of a time delay exerted by the delay timer.

Delay timer 203 includes a normally open off/on switch 216, a contactor 217, and a solenoid winding 218 which, when energized, closes the switch by bringing the contactor across terminals 219 and 220, after a delay of about 5 seconds. The criterial for selecting the duration of this delay will be more fully discussed below.

The circuitry which incorporates the foregoing relays will now be described. A battery 225 or other source of electricity is connected to common terminal 26 of an ignition switch 227. The switch has a contactor 228 that is connected to the common terminal 226, and that is movable selectively to contact and supply energy to cranking terminal 229, running terminal 230, and "off" terminal 231.

Cranking terminal 229 is connected to a starter motor 232, which is suitably grounded so as to operate when the contactor contacts terminal 229. It is also connected by lead 233 to entry lead 206 at Level A of primary relay 200. It is also connected by lead 234 to winding 235 of a normally closed relay switch 236. This winding is grounded at 237.

Switch 238 is connected in lead 239. Lead 239 is, in turn, connected to winding 218 of delay timer 203. Winding 218 is grounded at 241. Energizing relay switch 236 disables relay 203 and keeps its switch 216 open. Lead 239 connects to running terminal 230.

Lead 245 is connected to running terminal 230, and to entry leads 205 and 207 and thereby to Levels A and B, respectively, of primary relay 200.

Lead 250 is connected to running terminal 230, and, in series connection, to a vacuum switch 251 and a speed-responsive switch 252 ("rpm switch"). The vacuum switch is connected by conduit 253 to the induction means through conduit 171. It is open (non-conducting) at induction means pressures less than about 600mm Hg absolute, or such other pressure as is respective to heavy load and acceleration conditions. It is closed at pressures above that pressure value.

Speed-responsive switch 252 is connected to some rotary member of the engine whose rotational velocity is proportional to engine speed. It is open at engine crankshaft speeds above about 1,000 rpm, or such other engine speed, and is closed at slower speeds.

Lead 250 connects to lead 253 which in turn is connected to the solenoid winding 245 of an actuator 255 of an exhaust gas recirculation (EGR) control 256. Winding 254 is grounded at 257.

Lead 208 connects to a lead 260 which incorporates a diode 261 and then connects to lead 253.

Lead 208 also connects to lead 262 which in turn is connected to the solenoid winding 263 of a starter carburetor control 265. Winding 263 is grounded at 266.

Lead 211 connects lead 209 to the solenoid winding 268 of second gulp valve control 269. Winding 268 is grounded at 270. Control 269 controls actuator 270.

Lead 212 is connected to the solenoid winding 271 (FIG. 1b) of an accelerator pump control 272. Winding 271 is grounded at 273.

Lead 210 is connected to the solenoid winding 275 of a control 276 (on the other side of delay timer 203). In the illustrated embodiment, control 276 exerts a control over a cold-condition gulp valve actuator 277 and a valve element 278 that controls flow through a starter carburetor balance passage.

This system is equipped with a starter carburetor 300. The function of this starter carburetor is to provide an additional source of air/fuel mixture, which is usually richer than stoichiometric. It customarily includes a throat 301, and a fuel bowl 302 that receives fuel which is maintained at a suitable level by a float-actuated valve. The bowl is closed to atmosphere, except for limited communication through a bleed port 303 that faces the oncoming airstream upstream from the throat.

An emulsion tube 304 takes fuel from the bowl and receives air from air passage 305, which opens into the throat, and faces the oncoming airstream upstream from the throat. The air and fuel are mixed to form an emulsion which is discharged through emulsion port 306. The rate of supply of emulsion is determined in part by the pressure in the overlaying region 307 in the fuel bowl. The overlaying region overlays the liquid fuel in the bowl. A higher pressure in this region will result in a greater rate of flow than a lower pressure.

It has been found to be advantageous to provide a balance passage 308 that interconnects the overlaying region to the induction means at port 54.

Control 276 is placed in the balance passage and can prevent or permit flow through the balance passage. It is part of a three way valve having a first port 311, connected through the balance line to the overlaying region, a second port 312 connected to port 309 of gulp valve 278, and a third port 313 connected to a chamber 314 of first gulp valve 278. The valving member of control 276 is a magnetic plug 316 biased by bias spring 317 normally to close first port 311. Energizing of winding 275 will open port 311 to port 312. De-energizing of winding 275 will allow the bias spring to close port 311. This balance passage valve comprises ports 311 and 312, and the lower face of plug 316.

First gulp valve 278 is connected to port 54 through conduit 171 by a branch conduit 321 from the second port 312. The first gulp valve includes a valve 325 having a seat 326, a seal 327, and a passage 328 from atmosphere through a screen 329. A diaphragm 330 forms a flexible, movable boundary between closed chambers 314 and 332. A post 333 mounts seal 327 so it is movable toward and away from seat 326 to open and to close passage 328. A bias spring 334 will close this valve when pressures in the two chambers are equal, or are insufficiently different to move the diaphragm against the bias spring.

Chamber 314 is connected to port 313, and chamber 332 is connected to port 312 and also to the downstream portion of the induction means.

Gulp valve actuator means comprises a seat 340 at port 313 and the upper face 341 of plug 316, and port 312. The actuator also includes the two chambers 314 and 332, and the diaphragm because it is their combination which sets valve 325.

Control 276 can set the valves alternatively so that, when winding 275 is energized, ports 311 and 312 are connected in a first setting and flow can occur in the balance passage, and is enabled to flow through valve 325, and are connected in a second setting when de-energized so that flow cannot occur in either of the valves. The consequences of these settings will later be described.

It will be noted that if ports 312 and 313 are interconnected, pressure is equalized in chambers 314 and 332, and valve 325 will be closed by its bias spring. If ports 312 and 313 are shut off from one another then negative pressure from the induction means can open valve 325. Should there be a sufficiently low pressure in the induction means to demand it, for example on deceleration, air is enabled to flow in a "gulp" through gulp valve 277, via valve 325 and conduit 326 to port 327 in the induction means.

The starter carburetor includes an off-on disabling valve 350 which entirely prevents starter carburetor operation under certain conditions, namely a hot engine. A gate member 351 is slidably mounted to move across the throat to close it, or normally to move to the position shown in FIG. 1 where it permits flow. An actuator 352 includes a pair of chambers 353, 354. Chamber 353 is vented to atmosphere, and chamber 354 is connected by a vacuum conduit 355 to a solenoid valve 356. Bias spring 357 biases the gate member out of the throat.

Solenoid valve 356 is a three way valve which is normally closed. A port 358 is vented to atmosphere through a screen 359. Port 358 opens into a chamber 360 as does port 361 from vacuum conduit 355. A vacuum port 362 is connected through a unidirectional check valve 362a to a vacuum reservoir 363 which is kept pumped down to a low pressure by connection to conduit 171 through unidirectional check valve 364. This check valve holds the low pressure in the reservoir. The vacuum reservoir provides a source of suction to vacuum amplifier 166 and to port 362 via conduit 364a.

Bias spring 365 presses a magnetic plug 366 toward port 358 to close it and open port 362 so as to connect chamber 354 to vacuum. This will pull gate member 351 down to close the throat of the starter carburetor. Actuation of valve 356 will move the plug to shut off the suction by closing port 362 and venting chamber 354 through port 358. Then spring 357 will move the gate member to open the starter carburetor throat.

Actuator valve 370 for second gulp valve 377 has a construction similar to actuator 271, and will not be described in detail. Suffice it to say that this valve is normally biased to the condition shown, wherein the magnetic plug closes port 371 and disconnects chamber 372 from a vacuum port 373 connected to conduit 171. Then vacuum in chamber 374 can pull down the diaphragm and open the valve to enable gulp air to flow from port 375 to port 376 and thence to conduit 326 and port 327. If the winding is energized, valve 268 will open, pressures in chambers 372 and 374 will equalize, the spring will close the valve, and the gulp valve will be disabled.

A continuously acting accelerator pump 400 is provided which can operate continuously during deceleration, instead of only when mechanically actuated by the accelerator linkage, as is the situation with the mechanical accelerator pump. For this purpose, the pump has a body 401 with a pumping chamber 402, a vacuum chamber 403, an intake port 404, and outlet port 405, a recirculation port 406, and unidirectional check valves 407 and 408.

A gate valve member 410 is normally open and moves to close the recirculation port when winding 271 is energized. Vacuum chamber 403 is connected by conduit 413 to port 54.

When valve 410 is open, the pump cannot discharge fuel, because check valve 408 is by-passed and fuel is simply pressed back into the fuel bowl. When valve 410 is closed, the pump can function, because check valve 408 will prevent back flow of fuel. Fuel will be discharged through check valve 407 as a consequence of energy stored in bias spring 412 when pressure goes down in chamber 403 at the time of deceleration. This supply of fuel will continue until the bias spring is fully extended.

The functioning of the individual elements, and finally their cooperation, will now be described.

Exhaust Gas Recirculation

Exhaust gas recirculation is caused by opening of valve 156, and the actual rate of flow is determined by the amount of opening and the differential pressure between the exhaust means and the induction means. Opening of valve 156 is caused by a sufficient negative pressure in conduit 172 as exerted by vacuum amplifier 166. The vacuum amplifier's output is shown on FIG. 8. It can be reduced to zero, or to some other ineffectual value by venting conduit 119 to atmosphere through valve 256. The condition of valve 256 is detrmined by its actuator 255. When actuator 255 is not energized, then conduit 119 remains closed and a suitable operational signal can be applied to the vacuum amplifier. If the actuator 255 is energized, valve 256 will be opened and will prevent the recirculation of exhaust gas.

In both the starting (cranking) and running conditions, current is applied to Level A of the principal relay at respective terminals 205 and 206. At the lower temperatures of Range I and the first time portion of Range II, current will be conducted to lead 208 and thence through leads 260 and 253 to actuator 255 and thereby disable the exhaust gas recirculation feature. After the time delay in Range II and in all of Ranges III and IV, Level A will not disable the exhuast gas recirculation feature. (The time delay in Level A, Range II is between about 45 and about 60 seconds). However, current is supplied to lead 250 and through switches 251 and 252. When either of these switches is open, then as far as this branch of the circuit is concerned, actuator 255 will remain de-energized and exhaust gas recirculation is enabled.

Switch 251 is responsive to pressure in the throat and will remain open (tending to enable exhaust gas recirculation) at pressures which are lower than 600mm Hg abs. It closes at high pressures.

Switch 252 is speed responsive and tends to open (tending to enable exhaust gas recirculation) at engine speeds above about 1,000 rpm, and closes at slower speeds. Thus this combination of switches 252 and 253 will prevent exhaust gas recirculation by both simultaneously closing when the pressure is higher than 600mm Hg abs. and the speed is slower than 1,000 rpm. This corresponds to conditions of heavy load and of acceleration. When either switch is open, the exhaust, gas can recirculate. The consequence of the foregoing is that exhaust gas recirculation is prevented at the temperatures of Range I and at the temperatures of Range II for the first period of time in Range II. It is thereafter permitted except under conditions of heavy load and acceleration when the concurrent conditions of closure of switches 251 and 252 occur.

Starter Carburetor

The starter carburetor 300 is desired to be operated at lower temperatures but not at higher temperatures. During both the starting and running conditions, current is applied to Level A of the principal relay at the temperatures of Range I and during the initial time period at the temperatures of Range II but not thereafter and not in Ranges III and IV. During conduction, current is applied to leads 208 and 262 and thence to actuator 263. As a consequence of this actuation, the plug 366 closes port 362 and vents conduit 355 to atmosphere thereby venting chamber 354 to atmosphere. Bias spring 357 lifts gate member 351 out of the throat 301 of the starter carburetor and the starter carburetor is enabled to respond to engine demand. This situation persists until after the time delay in Range II (provided the temperatures do not first enter Range III) after which the starter carburetor is no longer enabled. This means that the starter carburetor cannot be brought into use at the higher temperatures of Ranges II, III and IV, except for the delay time (45 to 60 seconds) during starting in Range II. When actuator 263 is not energized, then plug 366 closes port 358 and interconnects conduits 364a and 355 thereby applying a negative pressure in chamber 354 tending to pull the gate member 351 down to shut off the starter carburetor at these higher temperatures.

Balance Pressure

Balance passage 308 is a time delayed function. It is intended that this passage be open while the starter carburetor is in operation but not during the cranking operation, or for about 3 to 5 seconds thereafter, when it would be too responsive to excessively low induction means pressure. Accordingly, it will be noted that with actuator 276 disabled and plug 316 closing port 311, the balance passage is closed but will be open when a current is applied through lead 210. This current can be secured only from lead 209 and through the delay timer 203 when Level B is also conductive.

Level B will conduct during Ranges I, II and III. Current is not applied to it during starting (cranking) operation. When the ignition switch is turned to run and current is applied at lead 207 and conducted to lead 209, it will also be applied to timer switch 216. This in turn will be able to close after about a 3 to 5 second delay when switch 236 has itself returned to a closed position after the starting condition is resumed. Thereafter, after that delay, actuator 276 will be actuated and the balance passage will be open to the induction means until Level B becomes non-conductive at Range IV.

First Gulp Valve

It is desirable to provide larger quantities of gulp air at cold temperatures than at high temperatures. Because the quantities involved are very different it is more convenient to provide an individual valve for each of these conditions. It will of course be recognized by persons skilled in the art that a single valve with a variable delivery rate could be provided instead, and still fall entirely in the scope of this invention. Alternatively, only one gulp valve, for cold operation, might be provided. However, it is best practice to provide a first and a second gulp valve, the first valve useful at lower temperatures and the second valve at relatively higher temperatures. Accordingly, first gulp valve 278 which is intended for the delivery of relatively larger quantity of air at lower temperatures, is provided to deliver its air under the control of an actuator 340 which forms a part of the same apparatus as actuator 376. When the pressures are substantially equal in chambers 314 and 332, then this valve will be closed as a consequence of the action of bias spring 332. When port 313 is closed by plug 316, then the lower pressure in chamber 332 can open the first gulp valve. This is actuated by the same actuator as winding 275 as just described in connection with the balance passage and accordingly their function is alternative in this embodiment.

Until the current is applied through lead 210 after a specific delay, there will be no gulp air delivered, and therefore this actuator serves to delay gulp air from this first gulp valve means until after the specific delay has elapsed. At that time, plug 316 will move upwardly to enable the gulp valve to open and function, and at the same time to complete the balance passage connection. This gulp valve will remain in operation throughout Ranges I, II and III after which it is disabled along with the balance passage.

Second Gulp Valve

Second gulp valve 377 is intended to operate at higher temperatures. Its delivery is at a relatively small rate and for this reason it may not be considered necessary to disable it during the time of starting, although this may be done if desired. It is under the control of control 267 that is responsive to actuator 268. In turn the gulp valve itself can operate when the plug in actuator 268 closed port 271. This will happen when its circuit from Level B is "off" but will not occur when it is "on". Accordingly, in Ranges I, II and III, the second gulp valve is disabled but it is enabled during Range IV by virtue of the fact that there is then no current supplied through lead 211. Therefore the plug disconnects port 371 and 373 from each other so that low pressure in chamber 374 can open valve 377. Thus the two gulp valves are alternative to each other in running.

Accelerator Pump

It is desirable to provide supplementary fuel all during the term of acceleration within the storage capacity of accelerator pump 400. This supply is enabled only during relatively lower temperatures and during running operations as a consequence of current applied from running terminal 230 through leads 245 and 207, 209 and 212. When Level B conducts and provides this current, then gate member 410 closes port 406 thereby enabling the accelerator pump to act as a pump. At the temperatures of Range IV when Level B is off, then gate member 410 will be withdrawn and the operation of the accelerator pump will be spoiled. However, when it is in operation, it will be seen that the vacuum in conduit 413 which enters the induction means will tend to exert a negative pressure at the left side of the diaphragm in the pump and will draw fuel from the bowl through port 404. If recirculation port 406 is closed by gate member 410, then when a suitably higher pressure is exerted at port 411, say as a consequence of the higher pressures due to acceleration conditions, the diaphragm will move to the right under the bias of the spring and pump additional fuel out of port 405 to the carburetor. This will continue as long as the acceleration conditions persist and there remains stroke for the diaphragm. Movement will stop should acceleration be continued longer than there is a supply of fuel in the pump. This pump is a self-regenerating type, tending to move the diaphragm back and forth as the pressure in conduit 413 changes. The pumping action will be spoiled by opening recirculation port 406 because then, when the pressure is such that the diaphragm moves to the right in FIG. 1, the fuel will simply be pressed back into the bowl.

The foregoing is believed to constitute a sufficient recitation of the operation of each of the subsystems. Their operation as a group at the various conditions is summarized as follows:

I. Starting Conditions

Contactor 228 contacts cranking terminal 229. Starter motor 232 runs. Lead 235 and winding 235 are energized. Switch 238 opens, locking switch 216 of delay timer 203 open. Lead 233 and Level A of principal relay 200 are energized. Level B does not have current applied thereto because contactor 228 is not in contact with terminal 229. IT SHOULD BE KEPT IN MIND THAT LEVEL B IS INACTIVE DURING CRANKING (STARTING) EVEN THOUGH ITS SWITCHING CONDITION IN RANGES I, II AND III IS ON.

A. Start in Range I (Level A is ON). Level B is inactive)
  1. (EGR) Lead 260 and actuator 255 of EGR control 256 energized. Control 256 vents conduit 119 to atmosphere, spoiling signal to vacuum amplifier and preventing enabling signal to chamber 161 of EGR valve 150. Exhaust gas recirculation prevented. No time delay.
  2. (STARTER CARBURETOR) Lead 262 and actuator 263 energized. Control 265 vents conduit 355 to atmosphere. Starter carburetor gate member 351 responds to bias spring 357 and opens throat of starter carburetor 300, enabling it to supply engine demand. No time delay.
  3. (BALANCE PASSAGE) Lead 210 and winding 275 of control 276 not energized. Plug 316 closes port 311, and thereby closes balance passage 308.
  4. (FIRST GULP VALVE) Lead 210 and winding 275 of control 276 not energized. Plug 316 responds to bias spring 317 and interconnects ports 312 and 313, disabling actuator 277 and closing first gulp valve 278.
  5. (SECOND GULP VALVE) Lead 211 and winding 268 of second gulp valve control 269 are not energized. The control disconnects ports 371 and 373, and suction in conduit 171 in chamber 374 opens second gulp valve 375 to deliver air to to conduit 326 and thereby to the induction means. No time delay.
  6. (ACCELERATOR PUMP) Lead 212 and actuator 271 not energized. Accelerator pump control 272 opens recirculation port 406, disabling the accelerator pump. No time delay.

B. Start in Range II (Level A is ON. The switching condition of Level B is first ON, then OFF). At start, and for the predetermined period of time thereafter (or until top temperature in Range II is attained, if sooner), as determined by the timer feature in Level A Range II, the conditions will be as described in IA 1–6, above. After said predetermined period of time, Level A switches to OFF, and the following conditions exist:
1. (EGR) Lead 260 and actuator 255 of EGR control 256 not energized. Control 256 closes, and conduit 119 supplies its signal to the vacuum amplifier, thereby providing for enabling signal to chamber 161 of EGR valve 150. Exhaust gas recirculation enabled. No time delay.
2. (STARTER CARBURETOR) Lead 262 and actuator 263 not energized. Control 265 connects conduit 355 to conduit 364a and to vacuum reservoir 363. Low pressure in conduit 355 to chamber 354 pulls gate member 351 downward and shuts off the starter carburetor.
3. (BALANCE PASSAGE) Same as IA3.
4. (FIRST GULP VALVE) Same as IA4.
5. (SECOND GULP VALVE) Same as IA5.
6. (ACCELERATOR PUMP) Same as IA6.

Note, however, that in Range II the crank operation will not usually last as long as the time delay in Level A, Range II (the time delay being 45 to 60 seconds). Therefore, the usual situation will be a sooner switching from cranking terminal 229 to running terminal 230.

C. START IN RANGES III AND IV.
Same as in IB 1 through 6.

II. Running Conditions

Contactor 228 contacts running terminal 230. Starter motor stops. Lead 250 energized to pressure and speed switches 251, 252 and permits energizing of actuator 255 under certain circumstances, as discussed more fully elsewhere. Lead 234 and winding 235 not energized; switch 238 closed. Lead 239 and winding 218 energized. Switch 216 will close after a time delay determined by delay timer 203 (usually 3 to 5 seconds), independently of principal relay 200. Lead 245 energizes, and energized both Level A and Level B at 205 and 207.

A. Running in Range I (Levels A and B both ON)
1. (EGR) Same as IA1.
2. (STARTER CARBURETOR) Sames as IA2.
3. (BALANCE PASSAGE) Lead 210 energized, but winding 275 and conditions initially the same as IA3, for the said time delay while switch 216 remains open for the duration of said delay, perhaps 5 seconds. Thereafter, switch 216 closes; winding 275 is energized; and plug 316 moves to close port 313 and connect ports 311 and 312, thereby completing balance passage and exposing bowl of starter carburetor to induction pressure after said time delay.
4. (FIRST GULP VALVE) Same as IIA3, but closure of port 313 isolates chamber 314 from chamber 332. Suction in conduits 321 and 171 opens first gulp valve 278 to enable it to supply air on demand, after said time delay.
5. (SECOND GULP VALVE) Lead 211 and winding 268 of second gulp valve control 269 energized. Port 371 and 373 are interconnected by opening of control, thereby disabling actuator 270 and holding second gulp valve 377 closed. No time delay.
6. (ACCELERATOR PUMP) Lead 212 and winding 271 energized. Gate valve member 410 moves to close recirculation port 406 and accelerator pump is enabled to pump on demand.

B. Running in Range II (Level A is ON, Level B is first ON, then OFF). Before the delay in Level A elapses, or Range II upper temperature is reached, whichever occurs first, conditions are as in IIA 1 through 6. After the delay in Level A elapses, conditions are as follows:
1. (EGR) Same as in IB1.
2. (STARTER CARBURETOR) Same as in IB2.
3. (BALANCE PASSAGE) Same as IA3.
4. (FIRST GULP VALVE) Same as IA4.
5. (SECOND GULP VALVE) Same as IA5.
6. (ACCELERATOR PUMP) Same as IA6.

C. RUNNING IN RANGE III
Same as running in last portion of Range II, i.e., IIB1–6.

D. RUNNING IN RANGE IV
1. (EGR) Same as in IIB1.
2. (STARTER CARBURETOR) Same as in IIB2.
3. (BALANCE PASSAGE) Same as in IA3.
4. (FIRST GULP VALVE) Same as in IA4.
5. (SECOND GULP VALVE) Same as in IA5.
6. (ACCELERATOR PUMP) Same as in IA6.

The settings of D3–6 are as a consequence of lack of conduction by relay 200, rather than as a consequence of lack of current from switch 227 to Level B.

The foregoing invention thereby provides a system for stabilizing the operation of an engine during start and various transient conditions. It provides control over a gulp air valve, over a starter carburetor, over a balance passage for the starter carburetor, and for exhaust gas recirculation. The construction is simple and straightforward, easy to maintain and for a mechanic to comprehend. It requires no substantial change to existing mechanisms, and utilizes readily available and well understood devices. The principal relay may readily be constructed by anyone skilled in the art and the vacuum amplifier is a well-known device in the automotive field already. For example Borg-Warner Corporation manufactures a UAC-2439-R100A type which can be utilized and the Ford Motor Company utilizes a vacuum amplifier under the style 9E451. A certain amount of minor experimentation may be required to determine the precise setting of the vacuum amplifier and the desired cutoff points for exhaust gas recirculation. Similarly the proportioning of the gulp valves and the starter carburetor will be required but these are all within the skills of a person skilled in the art.

The principal relay is a collection of on-off switches selected by temperature responsive means, and, at Level A, Range II, subject to a time delay. Such a relay can readily be constructed by anyone skilled in the art of circuitry.

To summarize, the invention provides means to:
(a) prevent the starter carburetor from supplying fuel when the engine is hot. A hot engine does not need the starter carburetor;
(b) close the balance line at starting plus a brief delay. This isolates the starter valve bowl from the induction means when there would be excessive response due to the temporary very low pressure in the induction means. Lower pressure in the bowl tends to raise the float level;

(c) shut off EGR at low speeds, when too much EGR is deleterious; at low load when more power is needed, and excessive EGR would reduce the power (NOx emission at low power levels is not excessive, so the cutoff under these conditions is not deleterious); and when cold, to enable the engine to start efficiently and run smoothly.

(d) disable gulp valve air delivery during cranking and for a few seconds thereafter, and if desired, to vary the amount of air delivered, as a function of temperature.

This invention is not to be limited by the embodiments shown in the drawings and described in the description which are given by way of example and not of limitation, but only in accordance with the scope of the appended claims.

We claim:

1. In a carburetion system for an internal combustion engine which includes a principal carburetor, a starter carburetor, and an air gulp valve, which carburetors discharge a mixture of air and fuel into induction means, the induction means including a throttle valve whereby an induction pressure is established at a downstream location from the throttle valve that is respective to engine operating conditions, the starter carburetor including a fuel chamber containing fuel overlaid by a region having limited communication with the atmosphere, balance passage means interconnecting the said downstream location to the region, the gulp valve comprising gulp valve means operable to atmosphere, and gulp passage means connecting the said gulp valve means to the said downstream location, the improvement comprising:

balance passage valve means in said balance passage means effective to permit or to prevent air flow through said balance passage means;

balance passage valve actuator means operably connected to said balance passage valve means adapted to set the said balance passage valve means to permit or to prevent said air flow;

gulp valve actuator means operably connected to said gulp valve to prevent or to enable flow of air from atmosphere through the gulp valve to said gulp passage means; and delay means operatively connected to both of said actuator means causing both of said actuator means to prevent said flows until after a predetermined period of time has elapsed following catching of the engine after cranking.

2. Apparatus according to claim 1 in which the two said actuator means comprise a single actuator which is common to both valves, and which functions alternatively to set the valves either to a first setting which prevents flow through both valve means, or to a second setting which permits flow through the balance passage means and enables flow through the gulp valve means.

3. Apparatus according to claim 2 in which the said actuator means comprises a solenoid which when energized causes one of said settings, and when not energized causes the other setting, the delay means delaying attainment of the solenoid condition which causes the second setting.

4. Apparatus according to claim 1 in which a disabling valve is provided to prevent flow of fluid from the starter carburetor to the induction means, and thermally sensitive means adapted and arranged to set the disabling valve to prevent said flow at higher temperatures.

5. Apparatus according to claim 4 in which time responsive means is provided in a middle temperature range initially to permit, and after no more than a maximum time has elapsed, to prevent said flow through the starter carburetor.

6. Apparatus according to claim 4 in which said disabling valve comprises a gate member in said starter carburetor.

7. Apparatus according to claim 1 in which a second gulp valve means is provided which has a lesser capacity for air flow than the first gulp valve means, and in which thermally responsive means is provided to select the gulp valve means which is to supply gulp air during deceleration.

8. Apparatus according to claim 1 in which an accelerator pump is provided to supply additional fuel during acceleration, and in which means is provided to disable said accelerator pump at higher temperatures.

9. Apparatus according to claim 1 in which means is provided to set both of said actuator means to prevent both of said flows during cranking of the engine.

10. Apparatus according to claim 1 in which an exhaust gas recirculation conduit interconnects exhaust means of the engine to the induction means, and in which an exhaust gas recirculation valve is disposed in said recirculation conduit, and adapted to open and close it to flow, and in which recirculation valve actuator means is provided which is at least partially responsive to engine temperature, and so arranged as to prevent recirculation of exhaust gas at relatively low temperatures, and to enable it at relatively higher temperatures.

11. Apparatus according to claim 10 in which said recirculation valve actuator means is further responsive to induction means pressure and engine speed, whereby to prevent recirculation of exhaust gas at acceleration and heavy load conditions.

12. In a carburetion system for an internal combustion engine which inclues a principal carburetor, a starter carburetor, and an air gulp valve, which carburetors discharge a mixture of air and fuel into induction means, the induction means including a throttle valve whereby an induction pressure is established at a downstream location from the throttle valve that is respective to engine operating conditions, the starter carburetor including a fuel chamber containing fuel overlaid by a region having restricted communication with the atmosphere, balance passage means interconnecting the downstream location to the region, the gulp valve comprising gulp valve means operable to atmosphere, and gulp passage means connecting the said gulp valve means to the downstream location, disabling means to prevent the flow of fluid from the starter carburetor to the induction means, an exhaust gas recirculation conduit, an exhaust gas recirculation valve disposed in said recirculation conduit, and recirculation valve actuator means so disposed and arranged as selectively to prevent or to enable recirculation, the improvement comprising:

relay means for controlling the aforesaid in respective temperature ranges during running operation as follows:

in a first range of low temperature, preventing recirculation, enabling the starter carburetor, and, after a delay from the start of running, enabling gulp air flow and flow through the balance passage means;

in a second range of higher temperatures than the first range, permitting recirculation and preventing the starter carburetor, both after no more than a specified maximum delay, and enabling gulp air flow;

in a third range of higher temperatures than the second range, permitting recirculation and preventing the starter carburetor, and enabling gulp air flow; and in a fourth range of higher temperatures than the third range, permitting recirculation and preventing the starter carburetor, and causing gulp air flow to be enabled at a different rate than formerly.

13. Apparatus according to claim 12 in which means is provided effective in the second, third and fourth ranges, to prevent recirculation at conditions of heavy load and acceleration.

14. Apparatus according to claim 12 in which accelerator pump means is enabled to supply additional fuel to the induction means in the first, second and third ranges, after an initial delay after starting.

15. Apparatus according to claim 12 in which means is provided to disable the balance passage means and the gulp valve means during cranking of the engine.

16. In a carburetion system for an internal combustion engine which includes a principal carburetor and a starter carburetor, which carburetors discharge a mixture of air and fuel into induction means, the induction means including a throttle valve whereby an induction pressure is established at a downstream location from the throttle valve that is respective to engine operating conditions, the starter carburetor including a fuel chamber containing fuel overlaid by a region having restricted communication with the atmoshphere, balance passage means interconnecting the said downstream location to the region, the improvement comprising:

balance passage valve means in said balance passage means effective to permit or to prevent air flow through said balance passage means;

balance passage valve actuator means operably connected to said balance passage valve means adapted to set the said balance passage passage valve means to permit or to prevent said air flow; and delay means operatively connected to the said actuator means causing said actuator means to prevent said flow until after a predetermined period of time has elapsed following catching of the engine after cranking.

17. In a carburetion system for an internal combustion engine which includes a principal carburetor and an air gulp valve, which carburetor discharges a mixture of air and fuel into induction means, the induction means including a throttle valve whereby an induction pressure is established at a downstream location from the throttle valve that is respective to engine operating conditions, the gulp valve comprising gulp valve means openable to atmosphere, and gulp passage means connecting the said gulp valve means to the said downstream location, the improvement comprising:

gulp valve actuator means operably connected to said gulp valve to prevent or to enable flow of air from atmosphere through the gulp valve to said gulp passage means; and delay means operatively connected to the said actuator means causing said actuator means to prevent said flow until after a predetermined period of time has elapsed following catching of the engine after cranking.

18. Apparatus according to claim 1 in which the carburetor forms an air/fuel mixture which is leaner than stoichiometric.

19. Apparatus according to claim 4 in which the carburetor forms an air/fuel mixture which is leaner than stoichiometric.

20. Apparatus according to claim 7 in which the carburetor forms an air/fuel mixture which is leaner than stoichiometric.

21. Apparatus according to claim 8 in which the carburetor forms an air/fuel mixture which is leaner than stoichiometric.

22. Apparatus according to claim 9 in which the carburetor forms an air/fuel mixture which is leaner than stoichiometric.

* * * * *